No. 624,414. Patented May 2, 1899.
J. W. WALTERS.
MOTOR WHEEL FOR VEHICLES.
(Application filed Dec. 21, 1898.)
(No Model.) 2 Sheets—Sheet 1.

WITNESSES:
Donn Turtchell
Theo. G. Hoster

INVENTOR
Julius W. Walters
BY Munn & Co
ATTORNEYS.

No. 624,414. Patented May 2, 1899.
J. W. WALTERS.
MOTOR WHEEL FOR VEHICLES.
(Application filed Dec. 21, 1898.)
(No Model.) 2 Sheets—Sheet 2.

WITNESSES:
Donn Twitchell
Geo. J. Hostuz

INVENTOR
Julius W. Walters.
BY Munn & Co
ATTORNEYS.

THE NORRIS PETERS CO., PHOTO-LITHO., WASHINGTON, D. C.

UNITED STATES PATENT OFFICE.

JULIUS WILLIAM WALTERS, OF NEW YORK, N. Y.

MOTOR-WHEEL FOR VEHICLES.

SPECIFICATION forming part of Letters Patent No. 624,414, dated May 2, 1899.

Application filed December 21, 1898. Serial No. 699,940. (No model.)

*To all whom it may concern:*

Be it known that I, JULIUS WILLIAM WALTERS, of the city of New York, borough of Manhattan, in the county and State of New York, have invented a new and Improved Motor-Wheel for Vehicles, of which the following is a full, clear, and exact description.

The object of the invention is to provide a new and improved motor-wheel for vehicles for propelling the latter in a very convenient and simple manner and without undue loss of power from the motive agent employed.

The invention consists of novel features and parts and combinations of the same, as will be fully described hereinafter and then pointed out in the claims.

A practical embodiment of my invention is represented in the accompanying drawings, forming a part of this specification, in which similar characters of reference indicate corresponding parts in all the views.

Figure 2:
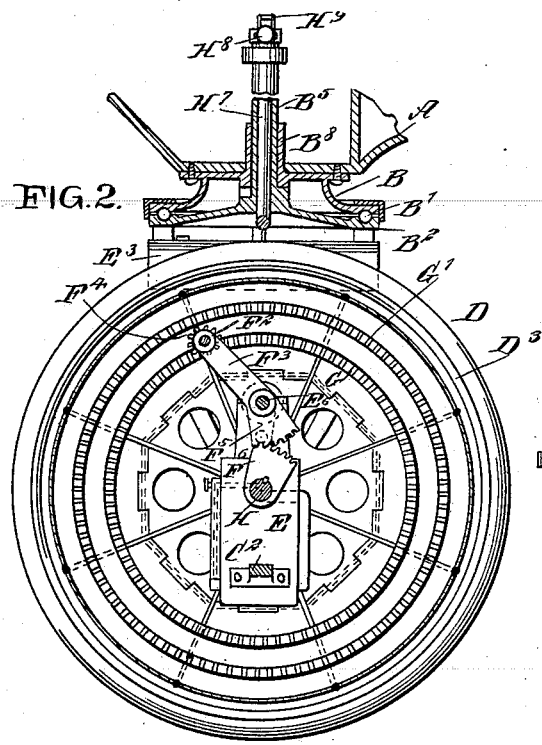
Figure 3:
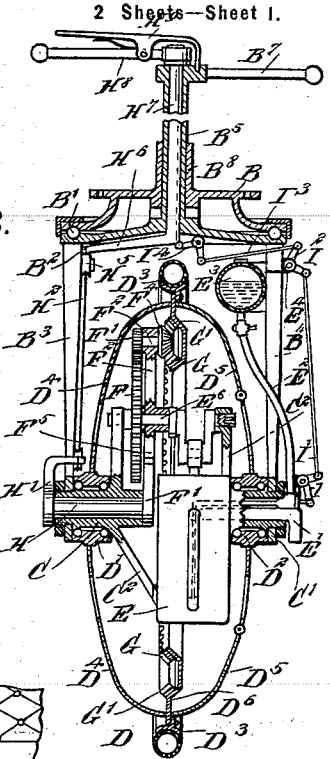
Figure 1:
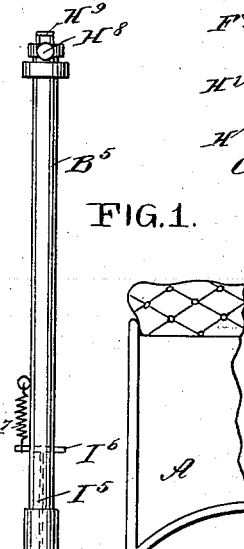
Figure 4:
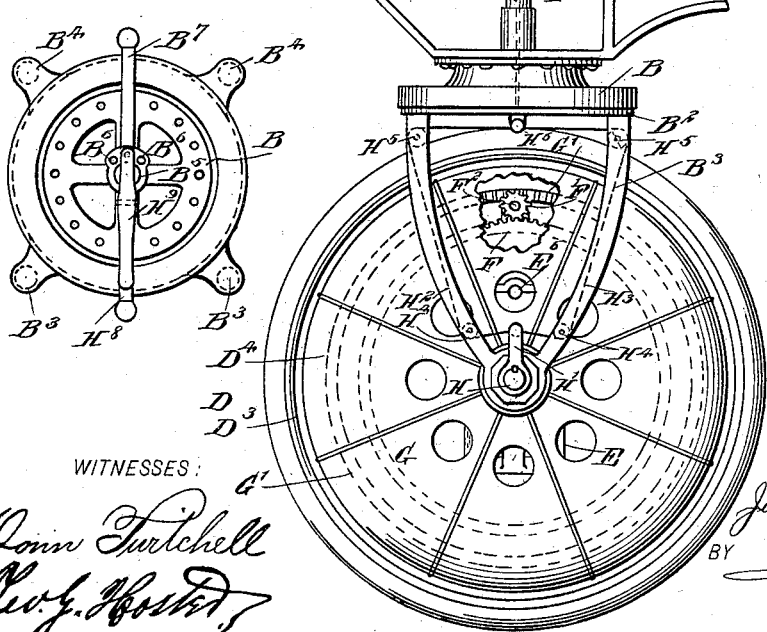
Figure 5:
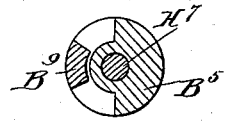
Figure 6:
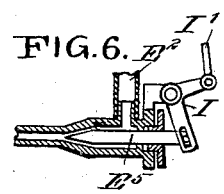
Figure 7:
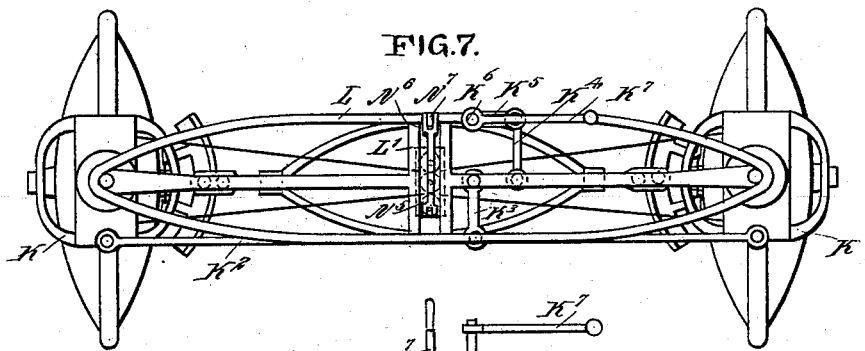
Figure 8:
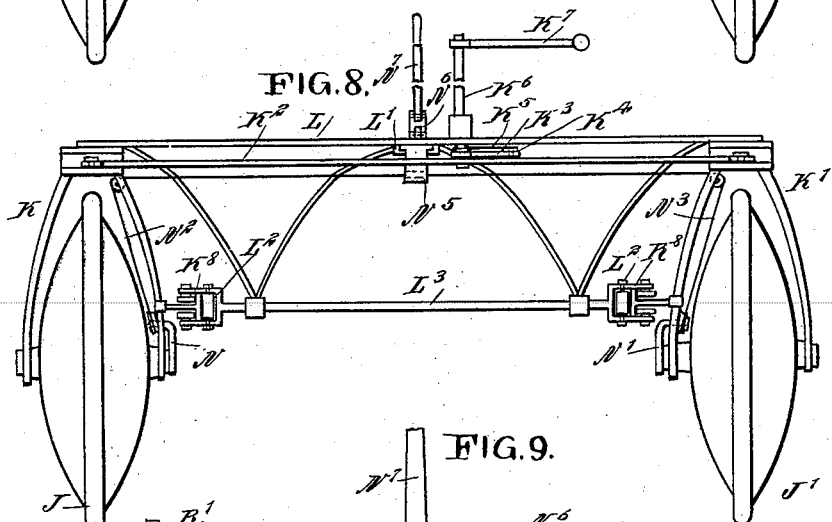
Figure 9:
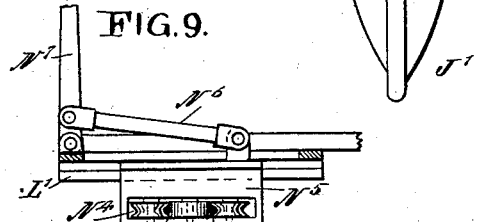
Figure 10:
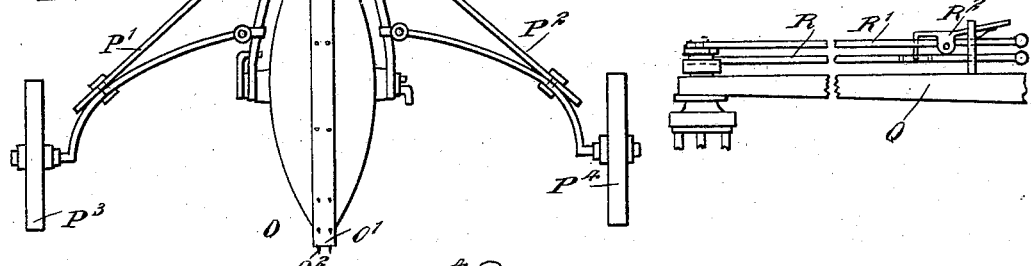
Figure 11:
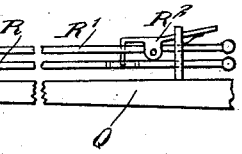
Figure 12:
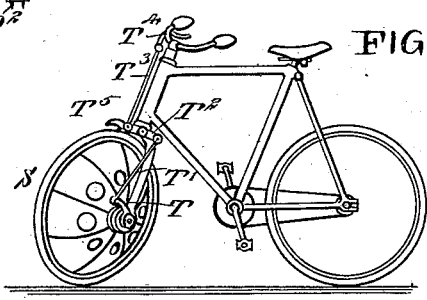

Figure 1 is a side elevation of the improvement with part in section and arranged as the front driving-wheel of a vehicle. Fig. 2 is a sectional side elevation of the same. Fig. 3 is a transverse section of the same. Fig. 4 is a plan view of part of the improvement. Fig. 5 is an enlarged sectional plan view of the stop of the steering device. Fig. 6 is an enlarged sectional side elevation of the cut-off valve for the engine. Fig. 7 is a plan view of the improvement as applied to two connected wheels. Fig. 8 is a front elevation of the same. Fig. 9 is an enlarged side elevation of the steering mechanism. Fig. 10 is a front elevation of the improvement as applied to a different vehicle. Fig. 11 is a side elevation of a modified form of steering, stopping, and starting mechanism; and Fig. 12 is a perspective view of the improvement as applied to a bicycle.

The motor-wheel illustrated in Figs. 1 to 6, inclusive, is applied to a vehicle A, having two hind wheels and one front wheel, of which the latter is the driving-wheel, and is provided with the improvement for rotating said wheel to propel the vehicle A forward or backward and for steering the vehicle, as hereinafter more fully described.

The body of the vehicle A is provided at its front end with a bearing-plate B, engaging ball-bearings B' on a plate $B^2$, having downwardly-extending fork-arms $B^3 B^4$, supporting alined sleeves C C', respectively, on which are mounted to turn by ball-bearings the alined hubs D' $D^2$ of a wheel D, the rim $D^3$ of which is connected by outwardly-curved webs $D^4 D^5$ with the said alined hubs D' $D^2$, respectively.

Within the two webs $D^4 D^5$ is arranged a motor E, preferably in the form of a gas or gasolene engine, having an air-supply pipe E' and a gas-supply pipe $E^2$, connected with a reservoir $E^3$, attached to the fork-arm $B^4$ and containing the motive agent to be used in the motor E. A stop-cock $E^4$ is arranged in the pipe $E^2$ for cutting off the supply of motive agent when the vehicle is not in use, and a valve $E^5$ (see Fig. 6) is employed and is under the control of the operator for controlling the supply of motive agent to the motor. The frame of the motor E is supported by suitable brackets $C^2$ from the sleeves C C', and the main shaft $E^6$ of said motor carries a gear-wheel F in mesh with a pinion F', secured on a short shaft $F^2$, journaled in an arm $F^3$, mounted to turn loosely on the main shaft $E^6$. On the shaft $F^2$ is also secured a bevel gear-wheel $F^4$, adapted to be thrown in mesh with either of the bevel gear-wheels G or G', carried by a suitable web $D^6$, forming part of the vehicle-wheel D. (See Fig. 3.)

The arm $F^3$ is provided with a segmental gear-wheel $F^5$ in mesh with a segmental gear-wheel $F^6$, secured on a shaft H, mounted to turn loosely in the sleeve C, the outer end of the shaft carrying an upwardly-extending arm H', connected with two ropes or cables $H^2 H^3$, extending in opposite directions and passing over friction-rollers $H^4$, journaled on the fork-arms $B^3$. The ropes or cables $H^2$ or $H^3$ then extend upward and pass over friction-rollers $H^5$ to then connect with an arm $H^6$, secured on the lower end of a shaft $H^7$, mounted to turn in the hub $B^5$ of the head-plate $B^2$, as is plainly illustrated in the drawings.

On the upper end of the shaft $H^7$ is arranged a handle $H^8$ under the control of the operator and provided with a locking-lever $H^9$, adapted to engage one of a series of notches $B^6$, formed on the upper end of the hub $B^5$, to lock said handle $H^8$ in any of three positions. When the locking-lever $H^9$ engages the middle notch $B^6$, as indicated in Fig. 4, then the bevel gear-wheel $F^4$ is out of mesh with either of the two gear-wheels G or G'; but when the lever $H^9$ is thrown out of engagement with said notch $B^6$ and the handle $H^8$ is then turned either to the right or to the left then a pull is exerted by the arm $H^6$ on either the ropes or cables $H^2$ or $H^3$ to impart a swinging motion to the arm H' and a turning motion to the shaft H, so that the segmental gear-wheel $F^6$ imparts a swinging motion to the segmental gear-wheel $F^5$ of the arm $F^3$ to swing the bevel gear-wheel $F^4$ in mesh with the gear-wheel G or G', according to the direction in which the handle $H^8$ was turned.

As shown in Fig. 2 the bevel gear-wheel $F^4$ is in mesh with the inner or smaller gear-wheel G, and when the handle $H^8$ is swung into an opposite working position then the bevel gear-wheel $F^4$ is thrown in mesh with the gear-wheel F' and a reverse motion is given to the wheel D. It is understood that the rotary motion given to the motor E, shaft $E^6$, and gear-wheel F is at all times transmitted by the pinion F' to the shaft $F^2$, so that the gear-wheel $F^4$ rotates the wheel D in either a forward or backward direction, according to the position of the arm $F^3$.

On the upper end of the hub $B^5$ is secured a steering-handle $B^7$, extending in an opposite direction to the handle $H^8$, and is likewise under the control of the operator. The hub $B^5$ is further provided with two shoulders, as indicated in Fig. 5, for abutting against a lug $B^9$, depending from the hub $B^8$, for the plate B, so as to limit the turning motion given to the said hub $B^5$ by the operator manipulating the handle $B^7$. It is understood that when the operator swings the handle $B^7$ forward or backward a turning motion is imparted to the hub $B^5$, and consequently to the plate $B^2$, mounted to turn on the ball-bearings B' and carrying the wheel D by the fork-arms $B^3$ $B^4$ and the sleeves C C'. By the arrangement described the vehicle-wheel is steered in the desired direction.

The valve $E^5$, previously mentioned, for controlling the supply of motive agent to the engine, is under the control of the operator's foot, and for this purpose the stem of the valve $E^5$ is connected with a bell-crank lever I, connected by a link I' with a bell-crank lever $I^2$, fulcrumed on the fork-arm $E^4$ and connected by a link $I^3$ with another bell-crank lever $I^4$, fulcrumed on the under side of the bearing-plate $B^2$. The bell-crank lever $I^4$ carries an upwardly-extending rod $I^5$, provided with a cross-arm $I^6$, adapted to be engaged by the operator's foot to enable the operator to press the arm $I^6$ downward to impart a swinging motion to the bell-crank lever $I^4$ and by the links $I^3$ I' and bell-crank levers $I^2$ I a sliding motion to the valve $E^5$ to open or close the passage leading from the pipe $E^2$ to the combustion-chamber of the engine. When the operator releases the pressure on the cross-arm $I^6$, a spring $I^7$ draws said cross-arm and connected parts back to their former position to move the valve $E^5$ open for further admission of the motive agent.

In the modified form shown in Figs. 7, 8, and 9 two motor-wheels J J' are employed, similar to the motor-wheel D, their fork-arms K K' being mounted to turn in the outer ends of a bolster L, forming part of the vehicle. The fork-arms K K' are pivotally connected with each other forward of their king-bolt by a link $K^2$, connected with a bell-crank lever $K^3$, connected by a link $K^4$ with an arm $K^5$ on the lower end of a shaft or staff $K^6$, mounted to turn in suitable bearings in the bolster L, the upper end of the staff carrying a handle $K^7$ under the control of the operator for steering the vehicle in the desired direction. When the arm $K^7$ is moved forward or backward, movement is given to the staff $K^6$ and by the arms $K^5$ and link $K^4$ to the bell-crank lever $K^3$, which pushes the link $K^2$ to the right or to the left to turn the fork-arms K or K' correspondingly and simultaneously and give the desired direction to the motor-wheels.

In order to insure an easy turning of the fork-arms K K', I provide the same with inwardly-extending segments $K^8$, engaged by rollers $L^2$ on the ends of a frame $L^3$, carried by the bolster L, as is plainly indicated in the drawings.

In order to control the connecting mechanisms between the motors and the wheels, I provide arms N N', which correspond to the arm H' in Fig. 3, with cords $N^2$ $N^3$, having pulleys $N^4$ mounted to turn in a slide $N^5$, fitted to move longitudinally in a guideway L', carried by the bolster L. The slide $N^5$ is connected by a link $N^6$ with an upwardly-extending lever $N^7$, fulcrumed on the bolster L and under the control of the operator. When the lever $N^7$ stands in a vertical position, then the bevel gear-wheels $F^4$ of both motor-wheels are out of mesh with the driving gear-wheels G G', and consequently no rotary motions are transmitted from the engines to the wheels; but when the lever $N^7$ is moved forward or backward then the cords are simultaneously actuated to impart swinging motions to the arms N N' and swing the gear-wheels $F^4$ in mesh with either of the bevel gear-wheels G or G' to turn the wheels forward or backward to propel the vehicle in a corresponding direction.

The motor-wheel O (shown in Figs. 10 and 11) is more especially designed for pulling a plow or the like, and in this case the rim O' of the wheel is provided with spikes $O^2$, and said wheel is journaled in forked arms P, mounted to turn in suitable bearings at the forward end of the plow-beam Q. (See Fig. 11.) The forked arms P support side frames P' $P^2$, in which are journaled wheels $P^3$ $P^4$ for steadying the motor-wheel during its travel over the ground. The motor-wheel is provided with a steering mechanism and with a connecting mechanism between the engine and the wheel proper, as previously explained, said device being under the control of the operator by means of links R R', extending rearwardly over the plow-beam to come under the control of the operator. A locking-lever R² is also employed for holding the links R R' in a locked position.

The motor-wheel S (shown in Fig. 12) is arranged as a driving and steering wheel for a bicycle; but as the latter does not require backward movement the inner gear-wheel G of the motor-wheel is omitted, and the bevel gear-wheel F⁴ is arranged to be thrown in and out of mesh with the other gear-wheel G' only, and for this purpose an arm T, which corresponds to the arm H' in Fig. 3, is connected by a link T' with a lever T², journaled on the fork of a bicycle, and a link T³ connects with a hand-lever T⁴ under the control of the operator. On the lever T² is arranged a brake-shoe T⁵, adapted to engage the rim of the wheel S after the bevel gear-wheel F⁴ has been thrown out of mesh with the bevel gear-wheel G' to permit of braking the wheel after the driving mechanism between the engine and the wheel is thrown out of gear.

From the foregoing it is understood that the motor-wheel for vehicles carries the motor in the wheel proper, and the power developed by the motor is directly transmitted to the wheel, and consequently undue loss of power is completely avoided, and at the same time the driving and steering wheel for the vehicle is completely under the control of the operator.

For starting the motor E, I prefer to apply a crank or the like on the main shaft to give a few turns to the latter, the crank after starting being removed.

Having thus fully described my invention, I claim as new and desire to secure by Letters Patent—

1. A device of the character described, comprising a wheel, supports therefor, a motor within the wheel, a mechanism for connecting the motor with the wheel to start, stop or reverse the wheel while the motor is still running said mechanism having a portion interior and exterior to the wheel, and a connecting device between said interior and exterior parts, said connecting device being concentric with the wheel, substantially as described.

2. A device of the character described, comprising a wheel, supports therefor, a motor within the wheel, and a mechanism for connecting the motor with the wheel to start, stop or reverse the wheel while the motor is still running, said mechanism having an outward-extending portion concentric with the wheel, and by means of which the said mechanism is operated, substantially as described.

3. A device of the character described, comprising a wheel, a frame on which said wheel is journaled, one of the supporting-journals of the frame being hollow, a motor within the wheel, a mechanism for connecting the motor with the wheel to start, stop or reverse the wheel while the motor is still running, such mechanism having a portion within and a portion exterior to said wheel, and a connecting device between said interior or exterior parts, said device being extended through the hollow journal, substantially as described.

4. A device of the character described, comprising a wheel having alined hubs, a supporting-frame having journals upon which the hubs of the wheel are mounted, one of the journals being hollow, a motor in the wheel, a mechanism for connecting the motor with the wheel to start, stop or reverse the wheel while the motor is still running, said mechanism having one of its shafts mounted in the hollow journal, and means for operating said shaft, substantially as described.

5. A device of the character described, comprising a wheel having alined hubs, a supporting-frame having hollow journals upon which the wheel is mounted, a motor supported by the frame in the wheel, a feed-supply leading to the motor through one of the hollow journals, a mechanism for connecting the motor with the wheel to start, stop or reverse the wheel while the motor is still running, said mechanism having one of its shafts mounted in the other journal of the frame, and means for operating said shaft, substantially as described.

6. In a device of the character described, the combination with a wheel, and a motor therein for operating it, of a supporting-frame having a vertical hub and journals upon which the wheel is mounted, one of the journals being hollow, a mechanism for connecting the motor with the wheel to start, stop or reverse the wheel while the motor is still running, said mechanism having one of its shafts in the hollow journal, a vertical shaft mounted in the hub of the frame, and a connection between the said shaft and the shaft of the mechanism working in the hollow journal, substantially as described.

7. In a device of the character described, the combination with a wheel, and a motor therein for operating it, of a supporting-frame provided with a vertical hub and with journals upon which the wheel is mounted, one of the journals being hollow, a reversing mechanism in the wheel and having one of its shafts mounted in the hollow journal, said shaft being provided with an arm at its outer end, a vertical shaft mounted in the hub of the frame and provided with an arm at its lower end, means for operating said vertical shaft, and a connection between the arms of the said shafts, substantially as described.

8. A motor-wheel, comprising two spaced axially-alining hollow hub parts mounted to rotate, a frame having members extending through said hollow hub parts, one of said members being hollow, a motor supported by the frame and located between said spaced hub parts, a shifting pinion in driving connection with said motor, an inner and an outer set of gear-teeth between which is located said pinion, said gear-teeth being on the wheel proper, a shaft extending through the hollow frame member and connected with said pinion to shift it into engagement with either set of gear-teeth and means for turning said shaft.

9. A motor-wheel, comprising two spaced axially-alining hollow hub parts mounted to rotate, a frame having members extending through said hollow hub parts, one of said members being hollow, a motor supported by the frame and located between said spaced hub parts, a fuel-supply pipe extending to the motor through the hollow frame member, a rim connected with said hub parts, and a driving connection between the motor and the rim.

10. A motor-wheel comprising a vehicle-wheel, a motor suspended within the wheel, a connecting mechanism between the motor and the wheel, for rotating the latter, and a reversing and disconnecting device for said connecting mechanism, to reverse the motion of the wheel or to throw the mechanism out of gear with the wheel, substantially as shown and described.

11. A motor-wheel, comprising two spaced axially-alining hollow hub parts mounted to rotate, a frame having members extending through said hollow hub parts, one of said members being hollow, a motor supported by the frame and located between said spaced hub parts, a fuel-supply pipe extending to the motor through the hollow frame member, a valve controlling the connection of said pipe with the motor, a valve-operating device extending through said hollow frame member, a rim connected with said hub parts, and a driving connection between the motor and the rim.

12. A motor-vehicle, provided with driving-wheels a motor in each wheel for rotating said wheel, a frame mounted on the wheels, and a connection between the wheels, to steer the same in unison, substantially as shown and described.

13. A motor-vehicle, provided with a bolster, driving-wheels having their fork-arms mounted to turn in said bolster, a motor in each wheel for rotating it, and a connection between said fork-arms, and under the control of the operator, for steering the wheels simultaneously, substantially as shown and described.

14. A motor-wheel for vehicles, comprising a wheel carrying two bevel driving-wheels, a framework-sleeve on which said wheel is journaled, an engine supported from said sleeve, and a gearing between the main shaft of the engine and said bevel driving gear-wheels, for rotating the motor-wheel in the usual direction, substantially as shown and described.

15. A motor-wheel for vehicles, comprising a wheel carrying two bevel driving-wheels, a framework-sleeve on which said wheel is journaled, an engine supported from said sleeve, a gearing between the main shaft of the engine and said bevel driving gear-wheels, for rotating the motor-wheel in the usual direction, and means for throwing said gearing out of mesh with either of the bevel driving gear-wheels, substantially as shown and described.

16. A motor-wheel for vehicles, comprising a wheel carrying two bevel driving-wheels, a framework-sleeve on which said wheel is journaled, an engine supported from said sleeve, a gearing between the main shaft of the engine and said bevel driving gear-wheels, for rotating the motor-wheel in the usual direction, means for throwing said gearing out of mesh with either of the bevel driving gear-wheels, and means, substantially as described, and under the control of the operator, for actuating the device for throwing the gearing in and out of mesh, as set forth.

JULIUS WILLIAM WALTERS.

Witnesses:
C. H. GARDNER,
LEWIS THOMPSON.